J. P. BOULTON.
METHOD OF COVERING SURFACES.
APPLICATION FILED MAY 25, 1912.
1,138,928.
Patented May 11, 1915.
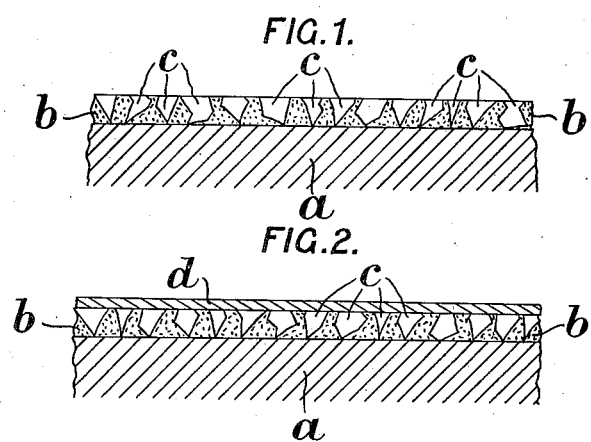

UNITED STATES PATENT OFFICE.

JOHN PATRICKSON BOULTON, OF BARROW-IN-FURNESS, ENGLAND.

METHOD OF COVERING SURFACES.

1,138,928.  Specification of Letters Patent.  Patented May 11, 1915.

Application filed May 25, 1912. Serial No. 699,794.

*To all whom it may concern:*

Be it known that I, JOHN PATRICKSON BOULTON, a subject of the King of Great Britain, residing at Croft House, Barrow-in-Furness, in the county of Lancaster, England, have invented a new or Improved Method of Covering Surfaces, of which the following is a specification.

This invention relates to a method of covering ships' bottoms and other surface to prevent fouling and corrosion, to render same waterproof and to increase the durability of such surfaces.

Furthermore although the invention is peculiarly suitable for the treatment of ships' bottoms, it is also applicable for other purposes such as for covering iron work, wood, stone and the like where a strong protective and relatively smooth covering is desired.

According to this invention, after applying paint, anti-corrosive composition or other liquid or material to the surface to be treated and while such paint or the like is still wet, moist, or plastic, finely granulated glass or similar appropriate hard substance from which the powder has been eliminated is sprayed on to the paint or the like by means of an apparatus of the kind usually designated as "sand blast apparatus", but it is obvious that any suitable means for projecting or depositing the granules of glass or the like on to the paint or the like may be employed and this process may be repeated so that an appreciable thickness is built up. It is important to eliminate the powder from the granules. In order to give a good smooth surface, the deposit of glass granules is rolled. The invention is thus distinguished by the fact that glass or like granules are embedded in the wet, moist or plastic coating so that what may be termed a mosaic is formed by the embedded glass or like granules, which is not the case when powdered glass is employed.

In carrying the invention into effect and according to one method, ordinary paint, priming or other adhesive or cementitious material is applied first of all, and allowed to dry, then a coating of anti-corrosive composition which is allowed to become tacky and then granulated glass adapted to just pass through a 1/24 sieve but from which the powder is eliminated is sprayed on to the composition. The spraying and rolling may take place simultaneously or almost simultaneously, and if well done fully three quarters of the surface may be covered with the glass granules. It is however obvious that the size of the glass granules is more or less dependent on the thickness or body of the paint or other material used, as it is desirable that the surfaces of the glass and the paint should be flush on completion. In some circumstances, it may be necessary to take into consideration the fact that while paint and anti-corrosive compositions generally are waterproof, anti-fouling composition is not always waterproof.

When the anti-corrosive paint or composition applied has become plastic or tacky and the glass granules have been sprayed thereon and rolled, by means for instance of a chilled steel or glass hand roller, the pressure and repeated rolling applied is suitably such that the granules of glass are embedded with a flat side outermost in the paint or composition and the latter fills up any holes or interstices between the granules which might otherwise allow access of water to the skin of the vessel, girder, or other object treated according to the invention, the paint or composition being thus caused to make, by the action of rolling as it were, a watertight joint with each particle.

The glass may be sprayed on to a mixture of anti-corrosive and anti-fouling composition. Or a light coat of anti-fouling composition, paint, or coach varnish may be applied after the rolling as aforesaid, or other smoothing process, and after the composition is set. If desired, such light coating may be wiped or rubbed down with the result that it is removed from the glass only, the interstices between the glass granules being left covered. In the case of ships or other vessels, the smooth surface thus provided, in addition to giving advantages in connection with the anti-fouling and anti-corrosive nature of the coating, may effect a considerable reduction in the skin friction and a very smooth surface can be obtained if a rubbing operation be performed in addition to the rolling operation aforesaid. The rubbing operation may be performed after the paint or composition has set and any desired degree of smoothness may be attained. The rubbing has the effect of removing protruding particles of paint from the surfaces or space intervening between the glass granules and from the surfaces or facets of the said granules. Moreover this process levels up pitted or uneven surfaces and diminishes damage due to galvanic action.

The glass granules are advantageously selected for the purpose of this invention by the use, say of a 1/24 sieve for eliminating granules which are too large and by the use of a 1/56 sieve for eliminating the powder or dust or the particles which are too small.

To further explain the invention, reference is made to the accompanying drawing in which:—

Figure 1 is a section of the improved coating as it may appear when magnified, and Fig. 2 is a similar view showing a finishing coating applied to the basic coating.

$a$ designates the coated surface and $b$ the covering material in which carefully selected glass granules $c$ have been embedded and rolled or otherwise smoothed, so as to bring facets of granules $c$ about flush with the covering material $b$.

In Fig. 2, $d$ designates a finishing coating as for example of coach paint or varnish which may be applied and rubbed down as hereinbefore described.

I claim:

1. Method of covering a surface comprising the application thereto of a coating of covering material, embedding in said coating before the complete drying thereof glass granules from which powder and particles of excessive dimensions have been eliminated by selection, and smoothing said coating so that facets of the granules and the surface of the covering material are brought flush with one another whereby a mosaic-like surface is produced, substantially as set forth.

2. Method of covering a surface comprising the application thereto of a coating of covering material, embedding in said coating before the complete drying thereof glass granules from which powder and particles of excessive dimensions have been eliminated by selection, and rolling said coating with sufficient pressure for causing facets of the granules and the surface of the covering material to be brought flush with one another whereby a mosaic-like surface is produced, substantially as set forth.

3. Method of covering a surface comprising the application thereto of a coating of covering material, attaching to said coating while still plastic glass granules from which powder and particles of excessive dimensions have been eliminated by selection, and smoothing said coating with sufficient pressure for causing said granules to be completely embedded in said coating and with facets of said granules flush with the surface of said coating whereby a mosaic-like surface is produced, substantially as set forth.

4. Method of covering a surface comprising the application thereto of a coating of covering material, spraying on to said coating while still moist glass granules from which powder and particles of excessive dimensions have been eliminated by selection, and rolling the resulting deposit of glass granules whereby a mosaic-like surface is produced, substantially as set forth.

5. Method of covering a surface comprising the application thereto of a coating of covering material, attaching to said coating while still plastic granules from which powder and particles of excessive dimensions have been eliminated by selection, smoothing said coating with sufficient pressure for causing said granules to become embedded in said coating with facets about flush with the latter whereby a mosaic-like surface is produced, applying a further coating or covering material, and wiping the last named from the facets composing said mosaic-like surface, substantially as set forth.

6. Method of covering a surface comprising the application thereto of a coating of covering material, attaching to said coating while still plastic glass granules from which have been eliminated particles having dimensions less than a certain minimum and particles having dimensions greater than a certain maximum, smoothing said coating and deposit of glass granules with sufficient pressure for causing said granules to be embedded in said coating with facets about flush with the latter, whereby a mosaic-like surface is produced, covering said mosaic-like surface with a coating of finishing material, and rubbing down the last named coating, substantially as set forth.

JOHN PATRICKSON BOULTON.

Witnesses:
H. WILLIAMS,
J. McCORMICK.